(12) United States Patent
Wang et al.

(10) Patent No.: US 11,934,383 B2
(45) Date of Patent: Mar. 19, 2024

(54) MIMETIC DATABASE-BASED NETWORK OPERATING SYSTEM DESIGN METHOD

(71) Applicant: ZHEJIANG LAB, Hangzhou (CN)

(72) Inventors: Peilei Wang, Hangzhou (CN); Ruyun Zhang, Hangzhou (CN); Tao Zou, Hangzhou (CN); Peilong Huang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 196 days.

(21) Appl. No.: 17/824,349

(22) Filed: May 25, 2022

(65) Prior Publication Data

US 2023/0169063 A1    Jun. 1, 2023

Related U.S. Application Data

(63) Continuation of application No. PCT/CN2022/084973, filed on Apr. 2, 2022.

(30) Foreign Application Priority Data

Nov. 26, 2021   (CN) .......................... 202111416379.0

(51) Int. Cl.
  *G06F 16/23*   (2019.01)
  *G06F 16/21*   (2019.01)
  *G06F 16/27*   (2019.01)

(52) U.S. Cl.
  CPC .......... *G06F 16/2365* (2019.01); *G06F 16/21* (2019.01); *G06F 16/275* (2019.01)

(58) Field of Classification Search
  CPC ..... G06F 16/2365; G06F 16/21; G06F 16/275
  (Continued)

(56) References Cited

U.S. PATENT DOCUMENTS

| | | | |
|---|---|---|---|
| 7,206,805 B1 * | 4/2007 | McLaughlin, Jr. ..... | G06F 9/466 707/999.01 |
| 7,657,581 B2 * | 2/2010 | Orenstein ............... | G06F 16/27 709/203 |

(Continued)

FOREIGN PATENT DOCUMENTS

| | | |
|---|---|---|
| CN | 111031096 A | 4/2020 |
| CN | 111314214 A | 6/2020 |

(Continued)

OTHER PUBLICATIONS

Lin-Na Zhao, et al. "Design and Test of Mimetic Database Model Based on Heterogeneous Redundancy" Computer Systems and Applications. 28.9 (Sep. 30, 2019).

*Primary Examiner* — Joshua Bullock
(74) *Attorney, Agent, or Firm* — IPro, PLLC

(57) ABSTRACT

The disclosure discloses a mimetic database-based network operating system design method, including: designing a mimetic data structure; designing a mimetic data object; designing a synchronization mechanism and a decision mechanism, designing a mimetic database safe storage command processing system, and designing a classification storage mechanism for interacting data between service modules and a master database in a network operating system. By means of vertical hierarchy and horizontal classification, the problem of compatibility of the database subjected to mimetic transformation and a network operating system is solved. By means of a memory random distribution storage mechanism and a memory hardware heterogeneous storage mechanism, the cost caused by mimetic transformation can be reduced, and the cost is controllable while the safety is improved.

9 Claims, 7 Drawing Sheets

(58) Field of Classification Search
USPC .......................................................... 707/802
See application file for complete search history.

(56) References Cited

U.S. PATENT DOCUMENTS

| | | | | |
|---|---|---|---|---|
| 8,909,814 | B1* | 12/2014 | Sumner | G06F 11/2097 |
| | | | | 709/224 |
| 10,346,374 | B1* | 7/2019 | Johnson | G06F 16/254 |
| 2007/0234293 | A1* | 10/2007 | Noller | G06F 11/3688 |
| | | | | 717/124 |
| 2012/0221536 | A1* | 8/2012 | Chen | G06F 16/275 |
| | | | | 707/802 |
| 2021/0241131 | A1* | 8/2021 | Khawas | G06N 3/08 |
| 2023/0169063 | A1* | 6/2023 | Wang | G06F 16/21 |
| | | | | 707/802 |

FOREIGN PATENT DOCUMENTS

| | | |
|---|---|---|
| CN | 112383528 A | 2/2021 |
| CN | 113505006 A | 10/2021 |
| CN | 113835685 A | 12/2021 |
| WO | 2021213293 A1 | 10/2021 |

\* cited by examiner

```
typedef struct dictEntry {          typedef struct safeDictEntry {
  void *key;                          void *key, *keyB, *keyC;
  union {                             union {
    void *val;                          void   *val;
    uint64_t u64;                       uint64_t u64;
    int64_t s64;                        int64_t s64;
    double d;                           double  d;
  } v;                                } v, vB, vC;
  struct dictEntry *next;             struct safeDictEntry *next;
} dictEntry;                        } safeDictEntry;
```

FIG. 4

| safeDictCreate | Create a new safe dictionary |
|---|---|
| safeDictAdd | Add a given key-value pair to the safe dictionary |
| safeDictReplace | Add a given key-value pair to the safe dictionary, and if the key already exists, replace an old value with a new value |
| safeDictFetchValue | Return a value of a given key |
| safeDictDelete | Delete the key-value pair corresponding to the given key from the safe dictionary |
| safeDictRelease | Release a given safe dictionary, delete and release all key-value pairs contained in the dictionary |

FIG. 5

MIMETIC DATABASE-BASED NETWORK OPERATING SYSTEM DESIGN METHOD

CROSS-REFERENCE TO RELATED APPLICATIONS

The present disclosure claims the priority of the Chinese Patent Application filed to the Chinese Patent Office on Nov. 26, 2021 with the application number 202111416379.0 and entitled "Mimetic database-based network operating system design method", which is incorporated herein by reference in its entirety.

TECHNICAL FIELD

The present disclosure relates to the technical field of network communication and databases, and in particular to a mimetic database-based network operating system design method.

BACKGROUND

In recent years, network operating systems represented by SONiC are in full swing, especially in software-defined network (SDN) scenes. SONiC enables the decoupling of a software operating system from a hardware platform to lead to a more open network, and is increasingly used in public cloud data centers and other areas. A network operating system often takes a database as the core, all modules of which are based on the interaction with the database, so that the safety of the database is crucial, and how to take into account database safety storage, read and write rates and version compatibility and other problems also need to be resolved.

SUMMARY

An objective of the present disclosure is to provide a mimetic database-based network operating system design method so as to overcome the deficiencies in the prior art.

To achieve the above objective, the present disclosure provides the following technical solution.

The present application discloses a mimetic database-based network operating system design method, wherein a network operating system includes a master database and various service modules that interact with the master database, and the master database includes five levels from high to low: server, database, data object, data structure, and data. The design method specifically includes the following steps:

S1, designing a mimetic data structure that implements mimetic homogeneous storage or mimetic heterogeneous storage of data, wherein the mimetic homogeneous storage is to back up the same data at multiple different addresses in the same existing memory, and the mimetic heterogeneous storage is based on a heterogeneous memory in an actual hardware platform environment to back up the same data in different memories;

S2, designing a mimetic data object that implements the organization and storage of the mimetic data structure, wherein the storage of the mimetic data structure is represented as one out of two between ordinary storage and mimetic storage;

S3, designing a mimetic database that implements the integration, management and storage of the mimetic data object, wherein the storage of the mimetic data object is represented as one out of two between ordinary storage and mimetic storage;

S4, designing a synchronization mechanism and a decision mechanism, wherein the synchronization mechanism is used for unifying the content in a homogeneous or heterogeneous database, a homogeneous or heterogeneous data object, or a homogeneous or heterogeneous data structure, and the decision mechanism is used for selecting a suitable data object in the homogeneous or heterogeneous database, selecting a suitable data structure in the homogeneous or heterogeneous data object, and selecting suitable data in the homogeneous or heterogeneous data structure;

S5, designing a mimetic database safe storage command processing system, wherein the processing system includes a safe storage command list, a safe storage command distributor and a safe storage command processor; and S6, designing a classification storage mechanism for interacting data between the service modules and the master database in the network operating system.

Preferably, the step S1 specifically includes the following sub-steps:

S11, designing a general framework and an external interface of the mimetic data structure, wherein the general framework includes a mimetic data item, and the external interface includes, but is not limited to, interfaces for creation, addition, deletion, modification, data acquisition, state acquisition, etc.;

S12, designing a mimetic storage management module that includes homogeneous storage management and heterogeneous storage management, wherein the homogeneous storage management uses a randomized memory allocation policy, and the heterogeneous storage management requires hardware heterogeneous support; and S13, designing a mimetic storage detection module for detecting, after cross-platform transplantation, whether an interface of the mimetic storage management module meets function and performance requirements, and automatically shielding a relevant mimetic storage function if the requirements are not met.

Preferably, a detection mechanism described in the step S13 includes, but is not limited to, the following methods:

S131, performing blocking detection in a power-on initialization phase of the system, and performing subsequent service logic after the detection is passed;

S132, performing time-periodic detection after the system is powered on, dividing all detection content into several parts, and detecting one of the parts after arrival of each time period; and backing up valid data during detection, and if a detection failure occurs at any detection node, shielding a hardware heterogeneous function, and converting the data backed up to mimetic homogeneous stored data; and S133, performing single-step detection after the system is powered on, and in the course of each mimetic data access processing, firstly detecting the interface of the mimetic storage management module, which is about to be called; backing up the valid data during the detection, and if the detection failure occurs at any detection node, shielding the hardware heterogeneous function, and converting the data backed up to mimetic homogeneous stored data; and recording a detection result after the detection is passed to avoid repeated detection.

Preferably, the step S2 specifically includes the following sub-steps:

S21, designing a general framework and an external interface of the mimetic data object, wherein the general framework includes a mimetic data structure item, and also includes a selection/mark item for ordinary storage or mimetic storage of the mimetic data structure, and the external interface includes, but is not limited to, interfaces for creation, addition, deletion, modification, etc.; and S22, designing a mimetic data structure management module for managing a mimetic data structure stored in the mimetic data object.

Preferably, the step S3 specifically includes the following sub-steps:

S31, designing a general framework of the mimetic database, wherein the general framework includes a mimetic key-value space and a non-mimetic key-value space; and S32, designing a mimetic data object management module for managing a key-value object in the mimetic key-value space.

Preferably, the synchronization mechanism in the step S4 is executed in the following cases:

S41, modification of data subjected to mimetic protection;
S42, inconsistent data found by decision; and
S43, time-periodic trigger.

Preferably, the safe storage command list in the step S5 includes a safety level feature, and the same safe storage command may have different safety levels.

Preferably, the safe storage command processor in the step S5 plans an organizational hierarchical structure according to the safety levels.

Preferably, the classification storage mechanism in the step S6 specifically has the following cases:

S61, with regard to data having no safety requirements and high coupling data, using an original database storage command or interface; and S62, with regard to low coupling data, selecting access modes of different safety levels according to safety requirements and access rate requirements.

Beneficial effects of the present disclosure: compared with the prior art, the mimetic database-based network operating system design method provided by the present disclosure solves the problems of insufficient safety and weak resistance to unknown risks in the existing network operating system. By means of vertical hierarchy and horizontal classification, the problem of compatibility of the database subjected to mimetic transformation and the network operating system is solved. By means of a memory random distribution storage mechanism and a memory hardware heterogeneous storage mechanism, the cost caused by mimetic transformation can be reduced, and the cost is controllable while the safety is improved.

The features and advantages of the present disclosure will be described in detail by means of embodiments in conjunction with the accompanying drawings.

BRIEF DESCRIPTION OF FIGURES

FIG. 4 is a schematic diagram of dictionary data structures before and after mimetic transformation.

FIG. 5 is a schematic diagram of names and functions of mimetic dictionary interfaces.

DETAILED DESCRIPTION

In order to make the objectives, the technical solutions and the advantages of the present disclosure clearer, the present disclosure is further described in detail below by accompanying drawings and embodiments. However, it should be understood that the specific embodiments described here are merely used to explain the present disclosure, but not intended to limit the scope of the present disclosure. Furthermore, in the following illustration, descriptions of well-known structures and techniques are omitted so as to avoid unnecessarily obscuring the concept of the present disclosure.

Figure 1:
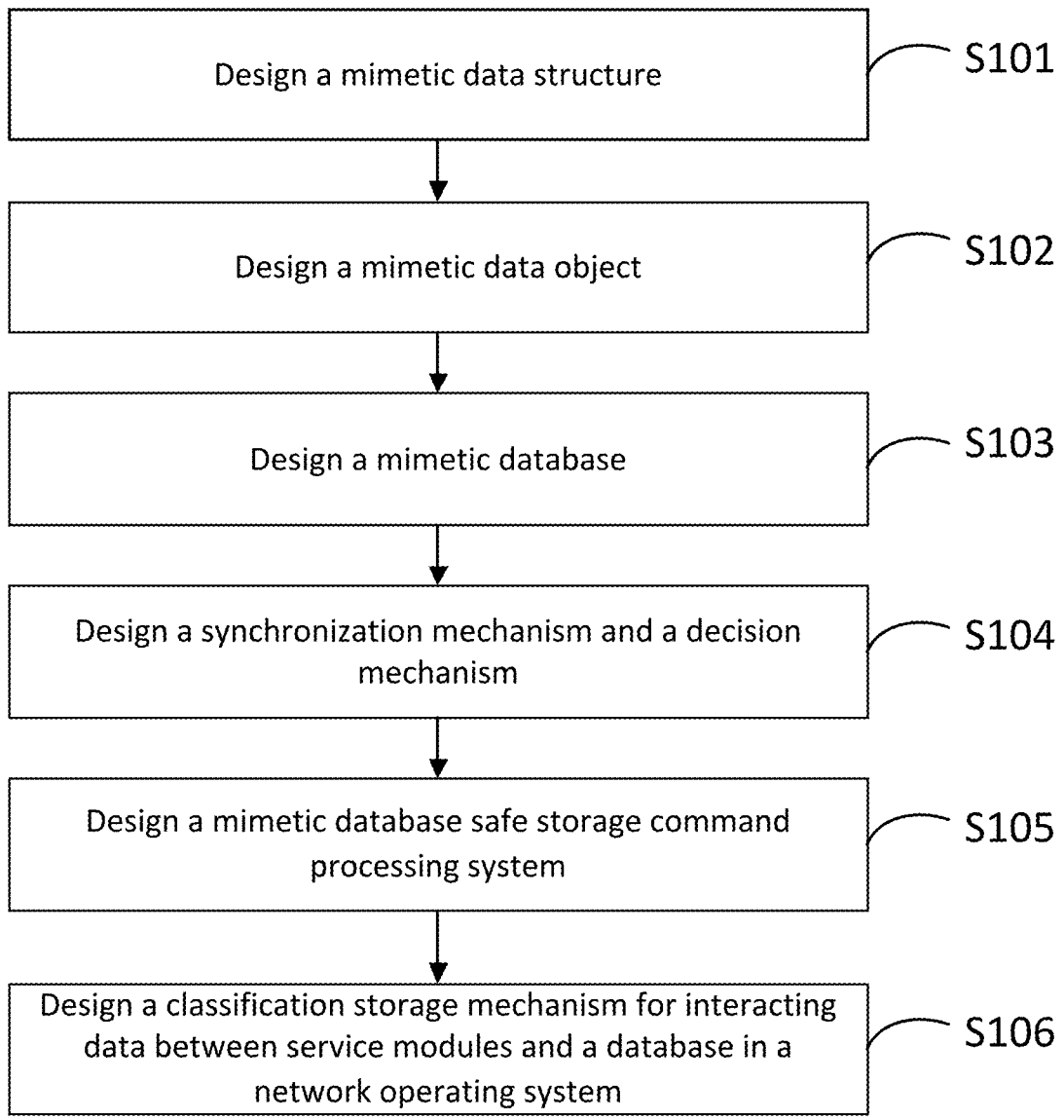
FIG. 1 is a flowchart of a mimetic database-based network operating system design method provided in an embodiment of the present disclosure.

Referring to FIG. 1, an embodiment of the present disclosure provides a mimetic database-based network operating system design method, wherein a network operating system includes a mimetic database and various service modules that interact with the mimetic database, and the mimetic database includes five levels from high to low: server, database, data object, data structure, and data.

Figure 2:
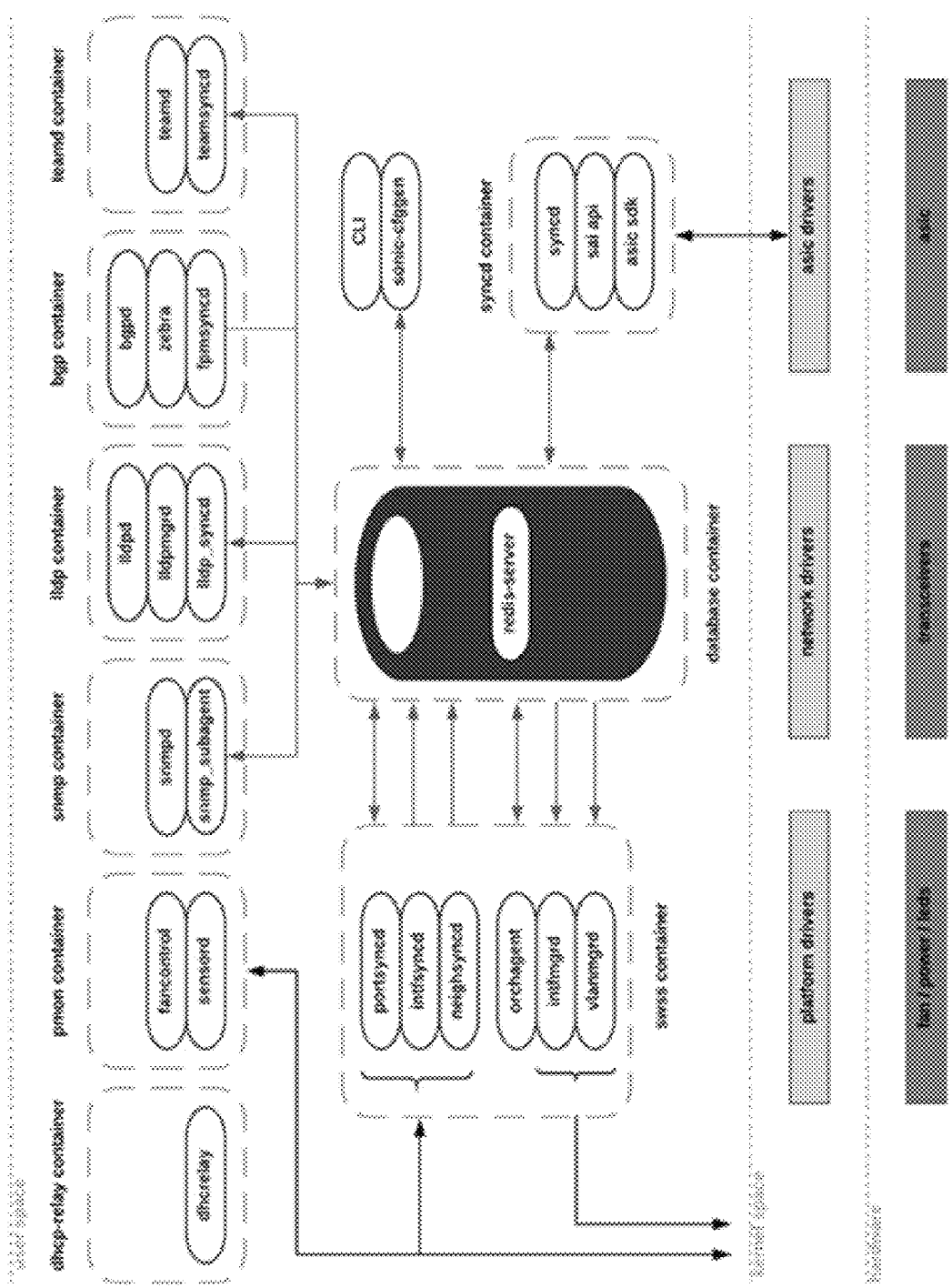
FIG. 2 is a schematic diagram of a SONiC system framework.

Specifically, referring to FIG. 2, the present disclosure is implemented using a SONiC system as a basic framework, a Redis database is located at the center of the SONiC architecture, and each service logic module directly interacts with Redis, thereby realizing data distribution and sharing.

Figure 3:
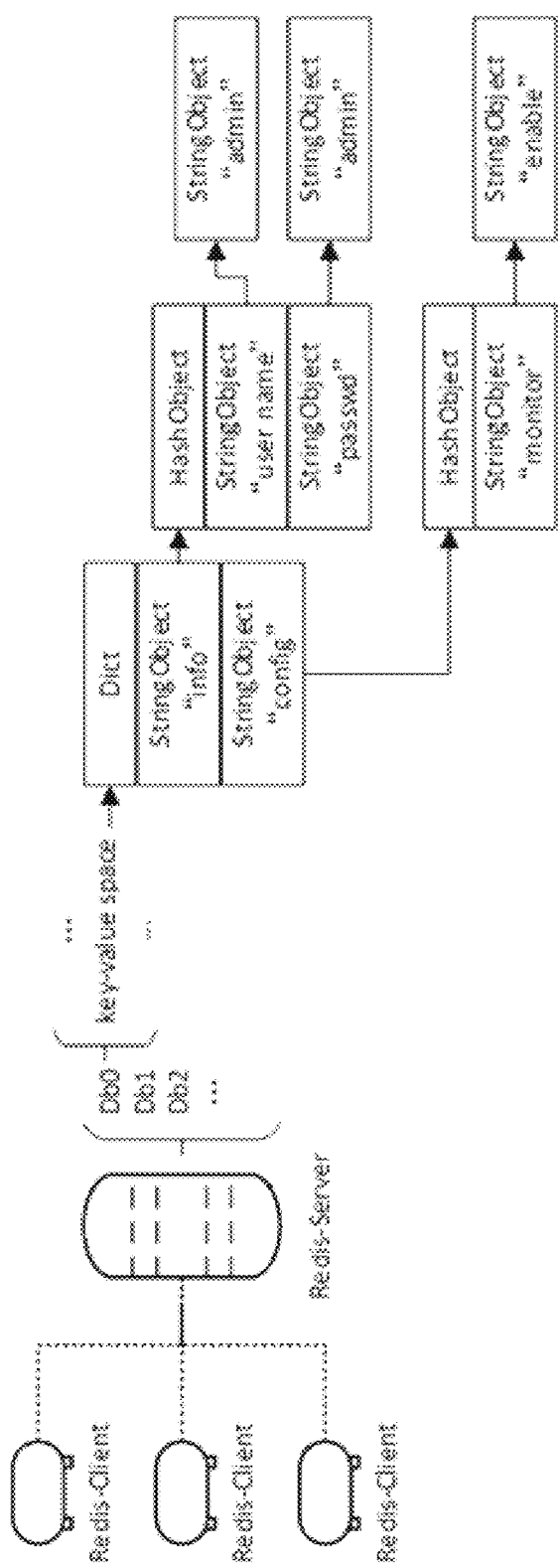
FIG. 3 is a schematic structural diagram of Redis hierarchy.

Redis is a memory database implemented in C language, and the embodiment of the present disclosure focuses on the mimetic transformation of Redis. Specifically, referring to FIG. 3, Redis itself can be divided into five levels: server, database, data object, data structure, and data. Redis is externally expressed as a server, which stores user data by means of hierarchical organization.

The design method specifically includes the following steps:

step S1, a mimetic data structure that implements mimetic homogeneous storage or mimetic heterogeneous storage of data is designed, wherein the mimetic homogeneous storage is to back up the same data at multiple different addresses in the same existing memory, and the mimetic heterogeneous storage is based on a heterogeneous memory in an actual hardware platform environment to back up the same data in different memories. The step S1 specifically includes the following steps.

Step S11, a general framework and an external interface of the mimetic data structure are designed, wherein the general framework includes a mimetic data item, and the external interface includes, but is not limited to, interfaces for creation, addition, deletion, modification, data acquisition, state acquisition, etc.

Specifically, a traditional linked list, set, dictionary, etc., can be subjected to mimetic transformation. It should be noted that the mimetic transformation here is not performed on all data structures in the database. The objective of the present disclosure is to construct a safe network operating system rather than a database, so that the mimetic transformation for a data structure needs to be performed according to the actual requirements of the network operating system.

Taking a Redis-based SONiC system as an example, the application of Redis by SONiC is mainly HSET, HGET and other commands, i.e., an operation for a hash object. The hash object in Redis has two encoding methods: compressed linked list and hash table, wherein the compressed linked list only stores data that takes up less space, and the main data storage work is completed by means of hash table encoding that is implemented relying on a dictionary data structure. Meanwhile, the dictionary data structure is also used to manage a key-value space in the Redis database. Therefore, an easiest method to achieve mimetic safe storage is to perform mimetic transformation on a dictionary, that is, to design a mimetic dictionary.

Redis is developed on the basis of C language. A dictionary data structure is not built in the C language, and needs to be implemented by itself. A mimetic dictionary may be designed on the basis of the implementation of a Redis native code. If a higher safety level is required, or if there is the ability and willingness to maintain a more complex code, more types of data structures, such as linked lists, sets, compressed sets, may also be subjected to mimetic transformation.

Specifically, referring to FIG. 4, a simple mimetic transformation on the dictionary data structure is as follows: a key node and a val node in the dictionary data structure are expanded from one to three, memory spaces pointed to by newly added key and val pointers need to be reallocated, and then original key and val values are copied respectively. Thus, the three key and val pointers point to the same data, but do not point to the same one piece of data. The choice of three copies here is for the subsequent decision module to use a majority decision solution. Of course, according to the decision solution actually used and the performance and requirements of hardware and software, a larger number of key and val values may be copied to achieve higher safety performance. The data copying process here may be analogized to the behavior of "distributing a task" to an executor in a mimetic defense design system.

Specifically, referring to FIG. 5, interfaces related to this module are designed and implemented, and, compared with interfaces related to original dictionary operations of Redis, omit some interfaces with unnecessary functions, which is equivalent to a functional subset of a customized standard dictionary data structure, thereby simplifying the difficulty of development and maintenance.

Step S12, a mimetic storage management module that includes homogeneous storage management and heterogeneous storage management is designed, wherein the homogeneous storage management uses a randomized memory allocation policy, and the heterogeneous storage management requires hardware heterogeneous support.

Specifically, under the mimetic data framework, when the same data is stored, multiple memory spaces need to be re-opened. The simplest memory allocation method is based on a malloc function, but this function tends to allocate a successive memory space, which is difficult to meet the requirements of mimetic storage. For the homogeneous storage that uses the randomized memory allocation policy or the heterogeneous storage based on hardware heterogeneous support, no matter which policy is used, the external interface of the entire mimetic storage management module remains consistent, and a user does not perceive the internal policy.

There are a plurality of modes to implement the homogeneous storage that uses the randomized allocation policy. One of the modes is based on a malloc/free function to firstly successively malloc a random number of times from which one is randomly selected to store data, and then release the remaining space. This mode is essentially malloc-based successive allocation, resulting in insufficient safety. Another implementation mode is to develop a safemalloc function with reference to malloc, and use a random allocation policy internally. This implementation mode is safer and more difficult.

Figure 6:
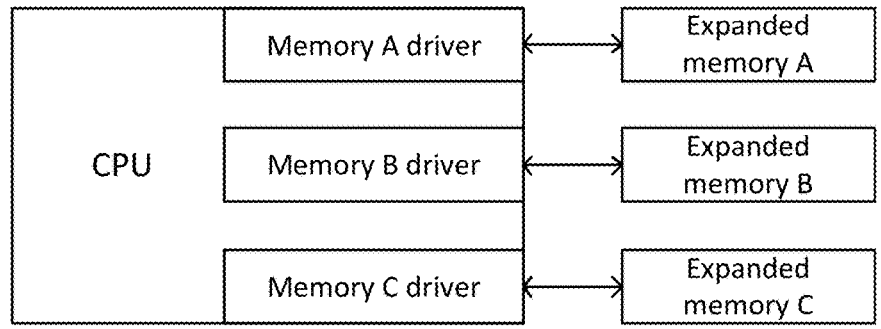
FIG. 6 is a schematic diagram of a hardware heterogeneous storage function.

Heterogeneous storage management requires hardware heterogeneous support. Specifically, referring to FIG. 6, a CPU has a plurality of externally expanded heterogeneous memories that can be accessed. These memories are configured to be dedicated to mimetic data storage by means of customized driver development, etc., so as to avoid being allocated by the system as virtual address spaces to different processes. In the case of hardware heterogeneous support, the data that needs mimetic storage may be distributed to externally expanded memories A, B and C, thereby realizing the heterogeneous storage and greatly increasing the attack cost of an attacker.

Step S13, a mimetic storage detection module is designed and used for detecting, after cross-platform transplantation, whether an interface of the mimetic storage management module meets function and performance requirements, and automatically shielding a relevant mimetic storage function if the requirements are not met.

Since hardware heterogeneous storage may not be supported by hardware, and a driver implemented by the user after cross-platform transplantation also has uncertainties in functions and performance, the functions of the hardware heterogeneous storage need to be isolated to prevent the situation that the hardware heterogeneous storage is found to be unavailable after power-on. On the one hand, the user may actively disable the hardware heterogeneous function by means of a configuration file; on the other hand, even if the user enables the hardware heterogeneous function, the functions and performance of the interface at this part need to be detected after the system is powered on. Specifically, the following methods are involved.

S131, blocking detection is performed in a powered-on initialization phase of the system, and subsequent service logic is performed after detection is passed.

This method is suitable for the design of a small-scale mimetic storage module, for example, the types and quantity of data for mimetic storage are both less, so that only simple mimetic storage modules and interfaces thereof need to be developed. The detection blocking time for these interfaces is short, and blocking detection after power-on may be used.

S132, time-periodic detection is performed after the system is powered on, all detection content is divided into several parts, and one of the parts is detected after arrival of each time period; and valid data is backed up during the detection, and if a detection failure occurs at any detection node, a hardware heterogeneous function is shielded, and the data backed up is converted to mimetic homogeneous stored data.

The detection method is specifically implemented as follows: a clock timer may be used, and detection is performed every about 10 s or 1 min. For example, a storage space to be detected is 100 M, and then the space of 10 M can be detected separately in 10 times.

S133, single-step detection is performed after the system is powered on, and in the course of each mimetic data access processing, firstly, the interface of the mimetic storage management module, which is about to be called, is detected; the valid data is backed up during the detection, and if the detection failure occurs at any detection node, the hardware heterogeneous function is shielded, and the data backed up is converted to mimetic homogeneous stored data; and after the detection is passed, a detection result is recorded to avoid repeated detection.

For example, if certain data needs to be stored in a certain 10 M space, before the relevant interface of the mimetic storage management module is called, the validity of the execution of the interface in a target space is detected. After the detection is passed, a mark is made to avoid repeating the detection for next storage. In this way, after a certain number of commands are executed, most or even all the interfaces of the mimetic storage management module may be detected once. According to this method, blocking hardly occurs, but the risk of potential program bugs is high and the maintenance cost is high.

In general, a combination of the three methods may be used. For example, the key detection is performed in a blocking manner in the power-on initialization phase, the less important detections are performed in steps in the clock period, and the remaining minority interfaces are subjected to single-step detection before being called.

Step S2, a mimetic data object that implements the organization and storage of the mimetic data structure is designed, wherein the storage of the mimetic data structure is represented as one out of two between ordinary storage and mimetic storage. Specifically, the following sub-steps are included.

step S21, a general framework and an external interface of the mimetic data object are designed, wherein the general framework includes a mimetic data structure item, and also includes a selection/mark item for ordinary storage or mimetic storage of the mimetic data structure, and the external interface includes, but is not limited to, interfaces for creation, addition, deletion, modification, etc.

The designing of the general framework and the external interface of the mimetic data object is the same as that of the mimetic data structure in principle, not all data objects in data types need to be subjected to mimetic transformation, but a portion of data objects in the data types are selected to be subjected to mimetic transformation according to the actual needs of the network operating system. Taking Redis-based SONiC as an example, similar to the fact that mimetic transformation only needs to be performed on an underlying dictionary data structure, at a data object layer, transformation only needs to be performed on most widely applied hash type objects in SONiC. In the Redis source code, the type constants of the data objects are REDIS_STRING, REDIS_LIST, REDIS_HASH, REDIS_SET and REDIS_ZSET respectively, and the type of REDIS_SAFEHASH may be added at the moment.

Figure 7:
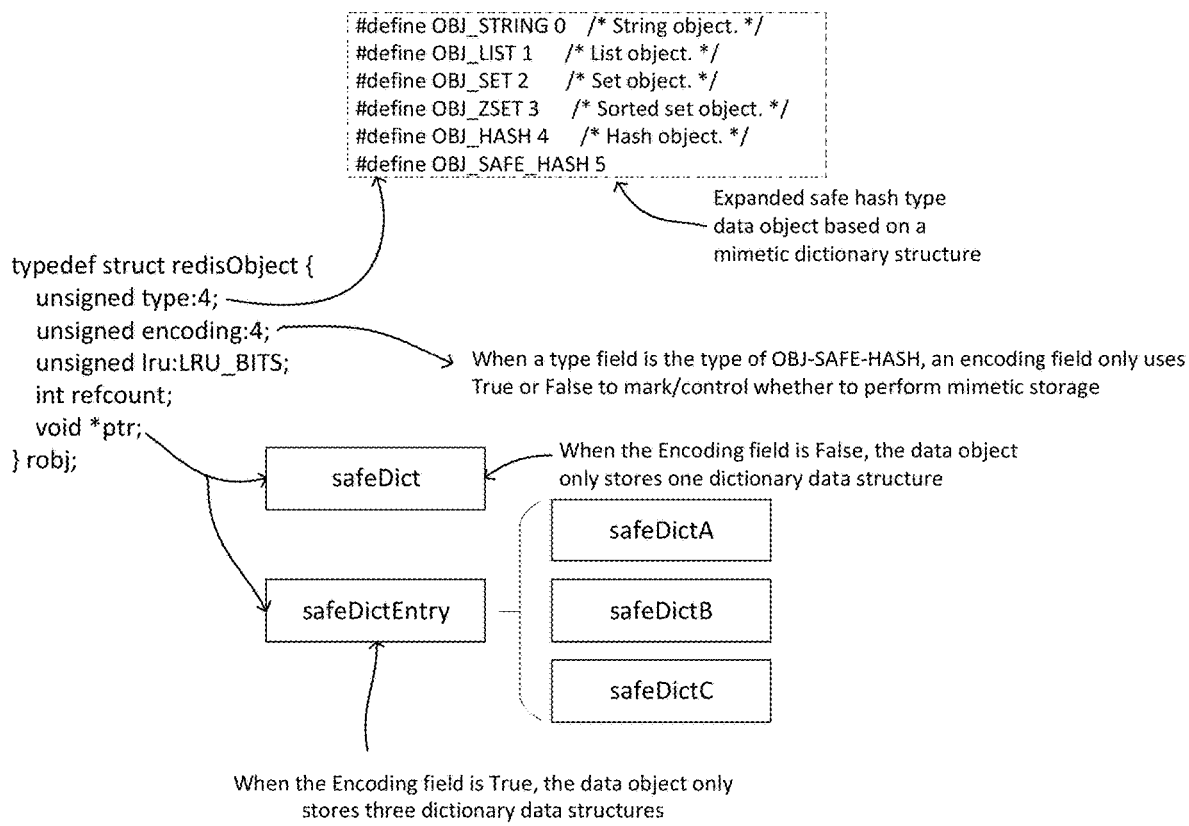
FIG. 7 is a schematic diagram of a framework of a mimetic hash object.

Referring to FIG. 7 for a structure of a data object in the Redis source code, an encoding field is originally used for marking an encoding format of a specific type of data. For example, a data object in a native hash type has two encoding formats, namely ziplisht and hashtable, wherein an underlying data structure corresponding to the hashtable encoding format is the dictionary data structure. This field can be multiplexed for the framework design of the mimetic data object. According to the above description, the type of the mimetic data object may be fixed as REDIS_SAFE-HASH, and the encoding format may also be fixed as safehashtable, and the corresponding underlying data structure is the mimetic dictionary safeDict data structure designed in the step S1. Therefore, the encoding field may be used for marking/controlling whether to perform mimetic storage on the mimetic dictionary safeDict. This mark/control bit determines whether one or more copies of the mimetic data structure in the mimetic data object are stored.

Referring to FIG. 7, a pointer of a mimetic hash object of Redis, which points to the underlying data structure is ptr, and the pointer can be expanded in a similar manner in the step S11, from one ptr to prtA, ptrB and ptrC. The structure framework may also keep unchanged, the ptr pointer points to another data structure safeDictEntry, and this data structure includes three pointers which respectively point to safeDictA, safeDictB and safeDictC subjected to homogeneous or heterogeneous storage. The latter mode is used as much as possible here, because the data object in Redis has a higher degree of coupling with other modules, and the implementation of the interface of the data object is more complicated, which is consistent with the implementation on the native framework, thereby avoiding producing a plurality of bugs.

In the Redis source code, the interfaces for the data object include interfaces for addition, deletion, modification and check in various object types and relevant service logic interfaces, whereas, mimetic transformation is performed on hash objects only, and only one type of interfaces for addition, deletion, modification and check needs to be retained for the external interface, which greatly reduces the workload of development and maintenance.

Step S22, a mimetic data structure management module is designed and used for managing a mimetic data structure stored in the mimetic data object.

For the storage of the mimetic data structure in the mimetic data object, reference may be made to the data storage of the mimetic data structure in the step S12, and a homogeneous mode or a heterogeneous mode is selected according to the hardware homogeneous support.

Taking the implementation of a mimetic hash object of Redis as an example, unlike the storage of data for the mimetic dictionary data structure described in the step S12, referring to FIG. 7, a mimetic dictionary data structure in the mimetic hash object can be either subjected to mimetic storage (i.e., three are stored), or subjected to non-mimetic storage (i.e., only one is stored). Therefore, the mimetic data structure management module needs to decide, according to an encoding field in the mimetic hash object structure, whether to use ordinary storage or mimetic storage.

The mimetic dictionary data structure management module may be defined as a structure which is instantiated to be a mimetic dictionary data manager. When a mimetic hash object is created, an associated mimetic dictionary data structure manager may be created synchronously, and different management functions are registered in the manager according to the encoding mark in the mimetic hash object. In this way, for operations related to data structure management in the mimetic hash object, a standardized named interface in the manager can be called directly, without determining the encoding type every time data management is performed. Thus, object-oriented polymorphic features can be realized.

Step S3, a mimetic database that implements the integration, management and storage of the mimetic data object is designed, wherein the storage of the mimetic data object is represented as one out of two between ordinary storage and mimetic storage. Specifically, the following sub-steps are included.

Step S31, a general framework of the mimetic database is designed, wherein the general framework includes a mimetic key-value space and a non-mimetic key-value space.

Figure 8:
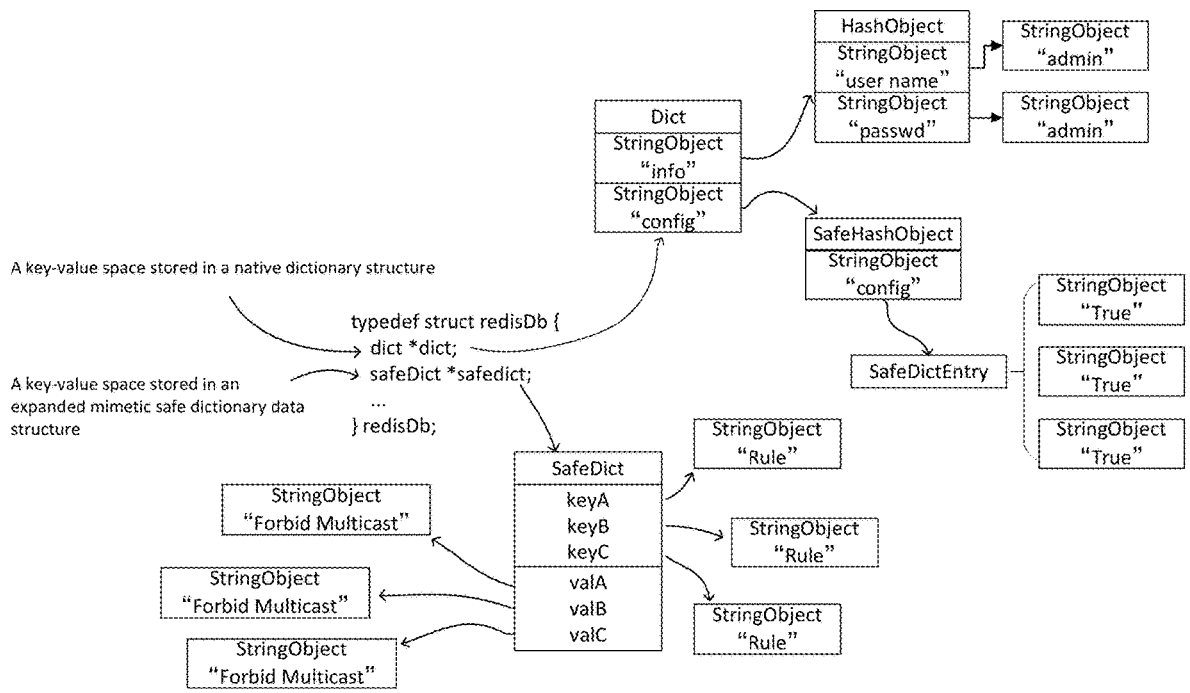
FIG. 8 is a schematic diagram of a framework of a mimetic database.

Specifically, referring to FIG. 8, in the Redis source code, there is only one hash table in the structure of the database as the key-value space. In the mimetic database framework, a mimetic hash table designed in the step S1 is added to serve as a mimetic key-value space for management. When a new key-value pair needs to be stored, whether the key-value pair is placed in either an ordinary key-value space or the mimetic key-value space is selected according to the command of the user.

Step S32, a mimetic data object management module is designed and used for managing a key-value object in the mimetic key-value space.

In the native Redis, the database manages the data objects in the key-value space by directly calling the interface of the data object module. In the transformed Redis, the database includes the mimetic key-value space and the ordinary key-value space, so it is necessary to design an additional mimetic data object management module which is instantiated to become a mimetic data object manager. In the manager, an ordinary data object management interface or a mimetic data object management interface is registered according to the associated key-value space, so as to avoid detecting the type of the key-value space in each call. Similar to the mimetic data structure manager in the step S22, object-oriented polymorphic features can be realized.

The mimetic database is stored in a server independently of the non-mimetic database. In a redisServer structure of the Redis source code, there is a redisDb item that stores native data information. In the embodiment, a redisSafeDb item, that is, a mimetic database item, is added to the Redis source code to avoid conflicts with native database related data and service logic thereof, and decoupling is performed as much as possible to reduce the difficulty of development and maintenance.

Step S4, a synchronization mechanism and a decision mechanism are designed, wherein the synchronization mechanism is used for unifying the content of a homogeneous or heterogeneous database, a homogeneous or heterogeneous data object, or a homogeneous or heterogeneous data structure, and the decision mechanism is used for selecting a suitable data object in the homogeneous or heterogeneous database, selecting a suitable data structure in the homogeneous or heterogeneous data object, and selecting suitable data in the homogeneous or heterogeneous data structure.

There are a plurality of modes to implement a mimetic synchronization mechanism and a mimetic decision mechanism. Here, due to the tight coupling between Redis and SONiC, and the performance requirements of SONiC for the database, simpler synchronization mechanism and decision mechanism are used.

Specifically, the decision here uses a simple majority decision policy. That is, there are three pieces of data (A, B, C) in each adjudication pool, and when all the three pieces of data are the same (A=B=C), any data (A or B or C) is finally returned; when two of the three pieces of data are the same (A=B≠C), the minority obeys the majority and any one (A or B) of the same data is returned; and if all the three pieces of data are not the same, it is determined that the data is severely damaged and an error signal is returned.

The synchronization mechanism is a process of maintaining the consistency of data in the decision pool. The synchronization mechanism plays a role in the following three cases:

S41, data subjected to mimetic protection is modified.

This refers to user-initiated modifications, such as updating a value corresponding to an existing key. At the moment, synchronization is required to update data subjected to homogeneous storage or heterogeneous storage synchronously.

S42, data is found to be inconsistent by decision.

This is the above case where A=B≠C. In general, this means that the data subjected to mimetic protection is modified passively, and is likely to suffer from external attack. At the moment, the synchronization mechanism is also mobilized to unify the homogeneous or heterogeneous data, and restore the data C to be in the state A=B=C.

S43, a time-periodic trigger is performed.

A synchronization action may be triggered periodically as a time event. Each key-value pair is traversed, the data subjected to mimetic transformation suffers from decision firstly, and the synchronization mechanism described in the step S42 is called if it is found that the data is different.

It should be noted that the traversing process here may cause blocking, so that synchronization can be performed in steps, that is, after arrival of a time period, only a part of the data is synchronized, the synchronization progress is recorded, and finally, the synchronization of all the data is completed in several time periods to prevent other service logic problems caused by long-time blocking at one time.

Step S5, a mimetic database safe storage command processing system is designed, wherein the processing system includes a safe storage command list, a safe storage command distributor and a safe storage command processor.

Specifically, the safe storage command list includes a safety level feature, and the same safe storage command may have different safety levels. The safe storage command processor plans an organizational hierarchical structure according to the safety levels.

In the native Redis code, all commands are instances of a redisCommand structure and are managed in redisCommandTable. Safe storage-related commands can multiplex the redisCommand structure and are expanded in redisCommandTable. In this way, the process of transmitting and executing commands between a client and a server in Redis is compatible.

For the safe storage commands for mimetic Redis, reference can be made to the commands related to hash types in native Redis, including HSET, HGET, HMSET, HMGET, HGETALL, HKEYS, HVALS, HLEN, etc. It is not necessary to implement all the above-mentioned commands here, and a part of the commands can be selected to be implemented according to the actual application of SONiC. For example, only four commands (HSET, HGET, HMSET and HMGET) can be implemented and renamed as SHSET, SHGET, SHMSET and SHMGET.

Figure 9:
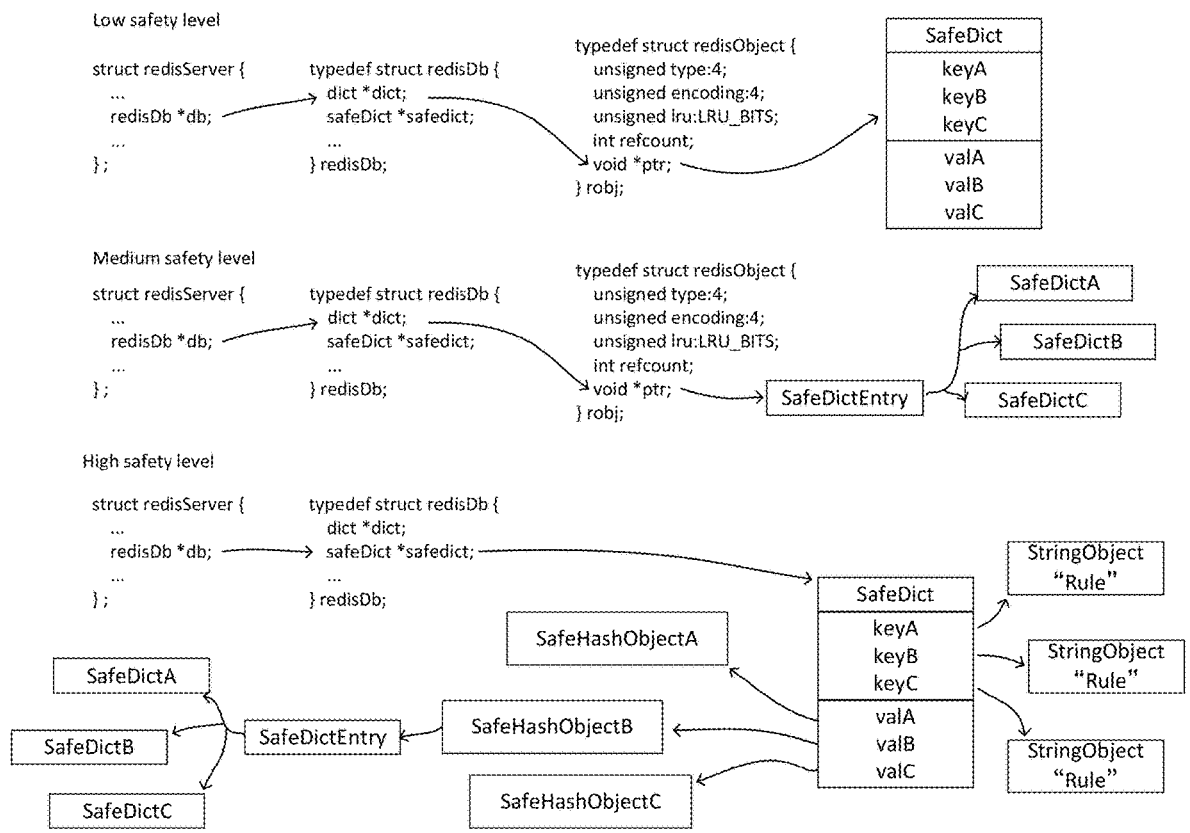
FIG. 9 is a schematic structural diagram of safety levels.

Write commands (SHSET, SHMSET) for the safe storage of the mimetic Redis require additional safety level features compared to the native hash type related commands. According to the aforementioned implementation solution, the safety levels can be classified as low, medium or high. Specifically, referring to FIG. 9, the Redis database includes five levels: server, database, data object, data structure and data. The low safety level corresponds to the mimetic storage of data only at the data structure level, that is, 1. in a database of the server, a key-value pair is created by selecting a key-value space of an ordinary dictionary structure; 2. in a key-value pair of an ordinary key-value space, a key is an ordinary string object, and a value is a safe hash object subjected to ordinary storage, that is, the ptr pointer in redisObject only points to one piece of data; and 3. in the safe hash object, the data is subjected to mimetic storage by means of a mimetic safe dictionary data structure.

The medium safety level involves mimetic storage at the data object level and the data structure level, that is, 1. in a database of the server, a key-value pair is created by selecting a key-value space of an ordinary dictionary structure; 2. in a key-value pair of an ordinary key-value space, a key is an ordinary string object, and a value is a safe hash object subjected to mimetic storage, that is, the ptr pointer in redisObject points to three pieces of data; and 3. in each safe hash object, the data is subjected to mimetic storage by means of a mimetic safe dictionary data structure.

The high safety level corresponds to mimetic storage for all nodes, that is, 1. in the database of the server, a key-value pair is created by selecting a key-value space of a mimetic safe dictionary structure; 2. in a key-value pair of a mimetic safe key-value space, a key is a string object with three backups, and the value is a safe hash object subjected to mimetic storage, that is, the ptr pointer in redisObject points to three pieces of data; and 3, in each safe hash object, the data is subjected to mimetic storage by means of a mimetic safe dictionary data structure.

After the mimetic transformation, the data subjected to the homogeneous or heterogeneous storage requires processes such as decision and synchronization, which will inevitably impact the performance of the server. The higher the safety level, the greater the impact. By means of vertical safety hierarchy, at the network operating system level, according to its own actual application, it is possible to use the low safety level (or even a native Redis mechanism is used to access) in scenarios with high read rate requirements, and the high safety level may be used in scenarios with high data safety requirements, and certain server access performance is sacrificed in exchange for higher safety performance.

Step S6, designing a classification storage mechanism for interacting data between the service modules and the database in the network operating system.

The following types may be specifically involved:

S61, with regard to data having no safety requirements, and high coupling data, using an original database storage command or interface; and S62, with regard to low coupling data, selecting access modes of different safety levels according to safety requirements and access rate requirements.

Taking the Redis-based SONiC system as an example, a plurality of containers that process service logic run at the same time in the system, and the server in Redis also runs in parallel as a separate container. Typical data with low access rate and high safety requirements is the configuration information of each service logic input by the user, and the information is forwarded to each destination container by using a Redis database container as an intermediate link. Typical data with high access rate and low safety requirements is log information of device operation, and access commands with low safety level or even no safety requirements may be used.

In the above-mentioned specific embodiments of the mimetic database-based network operating system design method, by means of vertical hierarchy and horizontal classification, the loose coupling between the part of the database subjected to mimetic transformation, and the original service logic is realized with the greatest possibility, thereby avoiding, to the greatest extent, the situation that the normal service logic cannot run due to the change in the database, and greatly reducing the development and maintenance costs. Meanwhile, even if there is no hardware heterogeneous storage support, through the software homogeneous random address distribution storage, the decision read and the synchronization mechanism, the goal of mimetic defense can also be effectively achieved, device hardware costs can be saved to the greatest extent, and the high cost characteristics caused by hardware architectures such as multiple CPUs can be avoided, and the improvement of the market value of the network device running the operating system is facilitated.

The above description is only the preferred embodiments of the present disclosure and is not intended to limit the present disclosure. Any modifications, equivalent substitutions, improvements, etc., made within the spirit and principle of the present disclosure shall fall within the scope of protection of the present disclosure.

What is claimed is:

1. A mimetic database-based network operating system design method, specifically comprising the following steps:

S1, designing a mimetic data structure that implements mimetic homogeneous storage or mimetic heterogeneous storage of data;

S2, designing a mimetic data object that implements the organization and storage of the data structure, wherein the storage of the data structure is represented as one out of two between ordinary storage and mimetic storage;

S3, designing a mimetic database that implements the integration, management and storage of the data object, wherein the storage of the data object is represented as one out of two between ordinary storage and mimetic storage;

S4, designing a synchronization mechanism and a decision mechanism, wherein the synchronization mechanism is used for unifying the content in a homogeneous or heterogeneous database, a homogeneous or heterogeneous data object, or a homogeneous or heterogeneous data structure, and the decision mechanism is used for selecting a suitable data object in the homogeneous or heterogeneous database, selecting a suitable data structure in the homogeneous or heterogeneous data object, and selecting suitable data in the homogeneous or heterogeneous data structure;

S5, designing a mimetic database safe storage command processing system, wherein the processing system includes a safe storage command list, a safe storage command distributor and a safe storage command processor; and S6, designing a classification storage mechanism for interacting data between service modules and a master database in a network operating system.

2. The mimetic database-based network operating system design method according to claim 1, wherein the step S1 specifically comprises the following sub-steps:

S11, designing a general framework and an external interface of the mimetic data structure, wherein the general framework includes a mimetic data item, and the external interface includes, but is not limited to, interfaces for creation, addition, deletion, modification, data acquisition, and state acquisition;

S12, designing a mimetic storage management module that includes homogeneous storage management and heterogeneous storage management, wherein the homogeneous storage management uses a randomized memory allocation policy, and the heterogeneous storage management requires hardware heterogeneous support; and S13, designing a mimetic storage detection module for detecting, after cross-platform transplantation, whether an interface of the mimetic storage management module meets function and performance requirements, and automatically shielding a relevant mimetic storage function under the condition that the requirements are not met.

3. The mimetic database-based network operating system design method according to claim 2, a detection mechanism described in the step S13 includes one of the following methods:

S131, performing blocking detection in a power-on initialization phase of the system, and performing subsequent service logic after the detection is passed;

S132, performing time-periodic detection after the system is powered on, dividing all detection content into several parts, and detecting one of the parts after arrival of each time period; and backing up valid data during detection, and under the condition that a detection failure occurs at any detection node, shielding a hardware heterogeneous function, and converting the data backed up to mimetic homogeneous stored data; and S133, performing single-step detection after the system is powered on, and in the course of each mimetic data access processing, firstly detecting the interface of the mimetic storage management module, which is about to be called; backing up the valid data during the detection, and under the condition that the detection failure occurs at any detection node, shielding the hardware heterogeneous function, and converting the data backed up to mimetic homogeneous stored data; and recording a detection result after the detection is passed to avoid repeated detection.

4. The mimetic database-based network operating system design method according to claim 1, wherein the step S2 specifically comprises the following sub-steps:

S21, designing a general framework and an external interface of the mimetic data object, wherein the general framework comprises a data structure item and a selection/mark item for ordinary storage or mimetic storage of the data structure, and the external interface comprises, but is not limited to, interfaces for creation, addition, deletion, modification; and S22, designing a mimetic data structure management module for managing a data structure stored in the mimetic data object.

5. The mimetic database-based network operating system design method according to claim 1, wherein the step S3 specifically comprises the following sub-steps:

S31, designing a general framework of the mimetic database, wherein the general framework comprises a mimetic key-value space and a non-mimetic key-value space; and S32, designing a mimetic data object management module for managing a key-value object in the mimetic key-value space.

6. The mimetic database-based network operating system design method according to claim 1, wherein the synchronization mechanism in the step S4 is executed in the following cases:

S41, modification of data subjected to mimetic protection;
S42, inconsistent data found by decision; and
S43, time-periodic trigger.

7. The mimetic database-based network operating system design method according to claim 1, wherein the safe storage command list in the step S5 comprises a safety level feature.

8. The mimetic database-based network operating system design method according to claim 1, wherein the safe storage command processor in the step S5 plans an organizational hierarchical structure according to the safety levels.

9. The mimetic database-based network operating system design method according to claim 1, wherein the specific operations of the classification storage mechanism in the step S6 are as follows:

S61, with regard to data having no safety requirements and high coupling data, using an original database storage command or interface; and S62, with regard to low coupling data, selecting access modes of different safety levels according to safety requirements and access rate requirements.

* * * * *